United States Patent [19]

Tancredi et al.

[11] 4,003,975

[45] Jan. 18, 1977

[54] SOLVENT EXTRACTION OF COPPER VALUES USING DIHYDROXY AZOARENES

[75] Inventors: John Frank Tancredi, Yorktown Heights; Patrick Bernard Sullivan, Peekskill; Glenn Franklin Mitchell, Bedford Hills, all of N.Y.

[73] Assignee: Union Carbide Corporation, New York, N.Y.

[22] Filed: Dec. 8, 1975

[21] Appl. No.: 638,432

[52] U.S. Cl. .................... 423/24; 75/101 BE; 75/117
[51] Int. Cl.² .................................... C22B 15/00
[58] Field of Search .......... 75/101 BE, 117; 423/24

[56] References Cited

UNITED STATES PATENTS

| | | | |
|---|---|---|---|
| 2,549,922 | 4/1951 | Neier et al. | 260/206 |
| 2,669,561 | 2/1954 | Schmelzer et al. | 260/149 |
| 2,891,047 | 6/1959 | Suckfull | 260/145 |
| 3,546,202 | 12/1970 | Budesinsky et al. | 75/101 BE |
| 3,558,288 | 1/1971 | Burrows | 75/117 X |
| 3,655,347 | 4/1972 | Mattison et al. | 75/117 X |
| 3,703,573 | 11/1972 | Blytas | 423/24 |

*Primary Examiner*—G. Ozaki
*Attorney, Agent, or Firm*—Bernard Francis Crowe

[57] ABSTRACT

Copper values are extracted from aqueous solution by dihydroxy azoarenes dissolved in a water immiscible organic solvent.

13 Claims, No Drawings

SOLVENT EXTRACTION OF COPPER VALUES USING DIHYDROXY AZOARENES

BACKGROUND OF THE INVENTION

This invention pertains to the solvent extraction of copper values using dihydroxy azoarenes as the extracting agent and more particularly to extraction of copper values from acidic aqueous solutions containing iron values.

Liquid ion exchange has been used as a separation process for removing metal ions of choice from an aqueous leach stream by utilizing an oil-soluble ligand having a particular affinity for that metal ion. The desired metal is subsequently stripped from the ligand in another operation. Liquid ion exchange, also referred to as solvent extraction, has been particularly successful in recovering copper from ores by leaching with a dilute aqueous acidic solution which is then extracted with a water immiscible solution containing a suitable ligand. The copper is next stripped from the ligand by strong sulfuric acid which concentrates the copper so that it can be recovered by electrolysis or other means known in the art.

Among the ligands which have been used in the past for the recovery of copper values are hydrocarbyl-substituted 8-hydroxy quinoline compounds, aminohydroxyalkyl compounds such as 9 (10)-amino-10 (9)-hydroxy stearonitrile, quinaldinic acids, hydroxy benzophenoximes such as 2-hydroxy-3'-methyl-5-ethyl-benzophenoximes, bisphenol sulfides, mixtures of amines and carboxylic acids, and the like.

While many of these ligands have performed in an acceptable manner in the initial chelating operation, it is known in the art that it would be desirable to operate at temperatures higher than room temperature. The combination of these elevated temperatures and the highly acidic operating conditions encountered causes decomposition over a long period of time requiring replenishment. This replenishment causes the cost of extraction of the copper values to increase. There is, therefore, a continuing search in this industry for improved ligands which combine high extracting power with stability in use.

The leaching process wherein the copper ions are separated from the ore by dissolution in sulfuric acid also affects the dissolution of iron such that the final acidic solution usully contains a higher concentration of ferric ions. The solvent extractant, to be useful, must be able to selectively extract copper ions in the presence of a large excess of ferric ions.

SUMMARY OF THE INVENTION

In the process for the recovery of copper values from an aqueous solution of copper and iron values, wherein said aqueous solution is contacted with an immiscible solution of an extracting agent in an organic solvent, and the resultant mixture is separated into a barren aqueous phase and a pregnant organic phase, and copper values are subsequently recovered from the organic phase by treatment with an aqueous acid solution, an improvement has been found which comprises utilizing as the extracting agent or ligand a dihydroxy azoarene having the formula Ar - N = N - Ar' wherein Ar and Ar' are each selected from the group consisting of

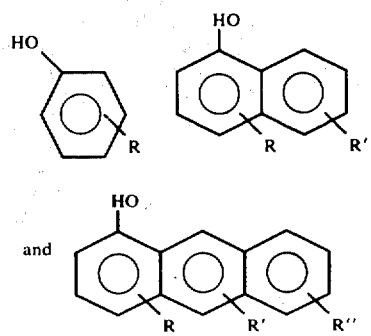

wherein each of R, R', R'' is a monovalent radical selected from the group consisting of hydrogen and alkyl groups having 1–20 carbon atoms.

The preferred extracting agents are the 2,2' dihydroxy azobenzenes with an alkyl substituent on at least one of the two benzene rings. Exemplary alkyl groups include methyl, ethyl, n-propyl, isopropyl, n-butyl, isobutyl, t-butyl, n-pentyl, isopentyl, n-hexyl, neohexyl, n-heptyl, n-octyl, isoctyl, nonyl, decyl, dodecyl, octadecyl, eicosyl, and the like.

The alkyl substituent can be in the 3, 4, 5 or 6 position of the benzene ring. They can be introduced by diazo coupling of the alkyl substituted aromatic raw materials followed by oxidative coppering, according to the method of Pfitzer outlined in Chemical Abstracts, Vol. 46, 5856 e(1952).

These extracting agents are highly selective for copper values in the presence of iron values even where the latter are present in much higher concentrations.

It is well known in the art of dye chemistry that hydroxy and dihydroxy azoarenes complex with metal ions to form metallized dyes. Several patents exist for their manufacture and the subject is thoroughly reviewed by K. Venkataraman in *The Chemistry of Synthetic Dyes*, Academic Press, NYC (1970). However, the activity of the dihydroxy azoarenes was quite unexpected since many ortho-hydroxy azo compounds used as metallized dyes outside the scope of this invention were found to be ineffective in extracting copper values under the above-described conditions. Such compounds include ortho-hydroxy azobenzene and various dyes such as Sudan I, Sudan II, Sudan III, para Red methyl Red and the like which have the structures shown below:

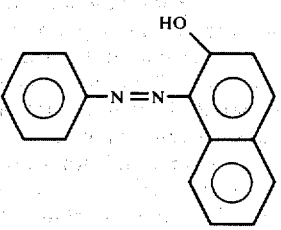

Sudan II

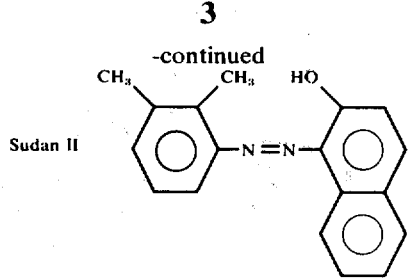

Sudan III

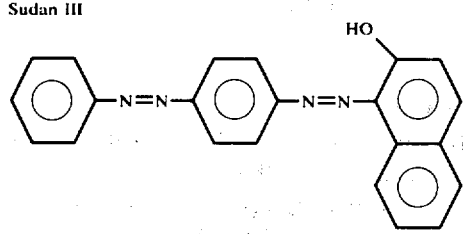

Para Red

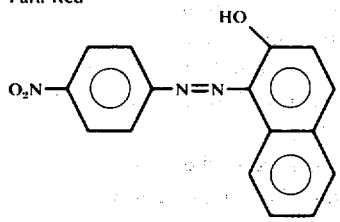

Methyl Red

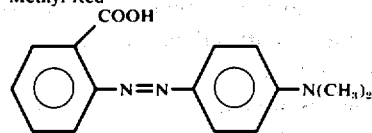

In order to evalute the relative performance of one ligand versus another, it is common to plot the percent extraction of metal ion from aqueous solutions into organic solutions at various pH concentrations. Extraction is measured by determining the ratio of the concentration of metal ion in the organic phase relative to the aqueous phase. Thus, initially in a 2-phase system of an insoluble organic carrier fluid and aqueous media, the percent extraction is zero. When the same carrier fluid contains an extractant, the metal ion leaves the aqueous phase and enters the organic phase. The amount of metal ion in the organic phase relative to the initial amount of metal ion in the aqueous phase gives the percent extraction. Thus, if an extractant removes all of the metal ions to the organic phase, this is referred to as 100 percent extraction.

Any water immiscible solvent which solubilizes the chelate can be used in the extraction process. However, most liquid-liquid ion exchange processes employ a water immiscible hydrocarbon solvent. The preferred solvents of this type are the aliphatic hydrocarbon solvents, such as the petroleum-derived liquid hydrocarbons, either straight chain or branched. Exemplary hydrocarbons include kerosene, fuel oil, and the like. Various aromatic solvents may also be used, such as, benzene, toluene, xylene and other aromatic solvents, as for example, those derived from petroleum processing operations which may contain alkyl substituted aromatic materials. Typical of the latter solvents are those sold under the Panasol trademark by Amoco Chemicals Corporation, both in the "RX" and the "AN" series. These solvents are liquid and essentially insoluble in water. Generally, all these hydrocarbon solvents have specific gravities in the range of 0.65–0.95 and have a mid-boiling point in the approximate range of 120° F. (49° C.) to 615° F.(324° C.) (ASTM Distillation). In addition to the simple hydrocarbon solvents, chlorinated hydrocarbons may also be used.

The invention is further described in the examples which follow. All parts and percentages are by weight unless otherwise specified.

EXAMPLE 1

Candidate ligands for the recovery of copper values were screened according to the following procedure. A 60 ml. separatory funnel was charged with 0.1 g. of the organic extractant and 10 ml. of kerosene which were then shaken for 10 minutes. Solubility of the organic extractant in the organic phase was noted. Then 10 ml. of aqueous copper sulfate solution (0.5024 g. per liter of copper sulfate which is equivalent to 0.2 g. per liter of cupric ion at pH 4.5) was added to the separatory funnel which was shaken for 20 minutes. The phases were then allowed to separate into an aqueous phase and an organic phase. A record was kept of the pH of the aqueous phase. The percent of copper extracted was determined by measuring the copper content of the raffinate (metal-depleted aqueous phase) by (Atomic Absorption Spectroscopy) AAS. The percent extraction was then determined from the fraction:

$$\% \text{ Cu extracted} = \frac{\text{original Cu Conc.} - \text{raffinate Cu conc.}}{\text{original Cu conc.}} \times 100$$

In the above test, pH was regulated by dropwise addition of aqueous sulfuric acid having a concentration of 200 g. per liter.

When 0.1 grams of 2,2'-dihydroxy azobenzene was evaluated according to the above described test with the aqueous phase treated with sufficient sulfuric acid to achieve a pH of 2.29, it was found that 100 percent of the copper value was extracted into the organic phase.

When 0.1 grams of 2,2'-dihydroxy azobenzene was evaluated according to the above, at lower pH values the data below were obtained:

| pH | % Cu Extraction |
|------|-----------------|
| 1.84 | 89 |
| 1.69 | 70 |
| 1.54 | 0 |
| 1.33 | 0 |

EXAMPLE 2

Example 1 was repeated with the exception that 10 ml. of methyl isobutyl ketone was substituted for the kerosene. The data obtained are tabulated below:

| pH | % Cu extraction |
|------|-----------------|
| 2.30 | 100 |
| 2.04 | 84 |
| 1.72 | 62 |

| pH | % Cu extraction |
|---|---|
| 1.47 | 2 |

EXAMPLE 3

Example 1 was modified to simulate field conditions by adding ferric ion to the aqueous solution to afford a concentration of 0.8 grams of iron per liter. Repeating Example 1 under these conditions indicated that 94 percent of the copper value and 0 percent of the iron value was extracted into the organic phase. This demonstrates the desired and unexpected specificity of the 2,2'-dihydroxy azobenzene for extracting copper ions in the presence of ferric ions.

EXAMPLE 4

CONTROLS A, B, C, D, E

Example 1 was repeated with the exception that the 2,2'-dihydroxy azobenzene was replaced by Sudan I, Sudan II, Sudan III, para Red and methyl Red. None of these materials, although structurally related to the 2,2'-dihydroxy azobenzene, extracted any of the copper value.

Example 1 indicates that 2,2'-dihydroxy azobenzene extracts copper ion selectively. In commercial practice, it is preferable to be able to increase the concentration of the chelating agent beyond the maximum solubility of 2,2'-dihydroxy azobenzene in a kerosene. Example 2 indicates the use of another organic reagent as the carrier fluid in which 2,2'-dihydroxy azobenzene is more soluble. It can be seen that 2,2'-dihydroxy azobenzene still exhibits high levels of extraction at pH 2.

A third way to improve the solubility of the chelating agent so that it could be used in a kerosene or other liquid hydrocarbon is to substitute for any of the hydrogen atoms on the aryl ring, an oil solubilizing group such as C-1 to C-20 hydrocarbon chain.

The following examples describe the preparation of an alkyl modified 2,2'-dihydroxy azobenzene, viz., 5-dodecyl-2,2'-dihydroxy azobenzene.

EXAMPLE 5

The preparation of 5-dodecyl-2,2'-dihydroxy azobenzene requires the preparation of 5-dodecyl-2-hydroxy azobenzene. This material was prepared in the following steps: 1) 131.2 Gms. of p-dodecylphenol was added to a large Erlenmeyer flask and 500 ml. of acetone was added to dissolve the p-dodecylphenol. A 10 percent sodium hydroxide solution was added to the above solution with constant stirring.

2) 46.6 Gms. of aniline was placed in a 5-liter round bottom flask equipped with stirrer and thermometer. The flask was covered to prevent light entry and immersed in an ice bath such that the temperature was maintained at −10° C. With stirring, 86 ml. of 11.6 M hydrochloric acid was added to the aniline. A solution of 36.23 gms. of sodium nitrite and 100 ml. of water was prepared and slowly added to the aniline/hydrochloric acid mixture.

3. The reaction mixture of step 2 was kept in the ice bath and to it under constant stirring the product of step 1 was slowly added.

4. At completion of the reaction, the aqueous phase was separated and 1 liter of hexane was added to dissolve the oily layer. This organic layer was washed several times with water. Hexane, acetone and unreacted aniline was then removed from the product.

Carbon, hydrogen, nitrogen, infrared analysis, proton NMR and Carbon 13 NMR indicated the final product to be 80% of 5-dodecyl-2-hydroxy azobenzene and 20% paradodecyl phenol.

CONTROL A

In order to determine if the intermediate materials of Example 5 would extract copper, an isolated fraction of 50% p-dodecyl phenol and 50% 5-dodecyl-2-hydroxy azobenzene was tested for its ability to extract copper ion from acid solutions according to procedure outlined in Example 1. In this case, diethyl benzene was used as the hydrocarbon solvent.

| pH | % Cu extraction |
|---|---|
| 4.88 | 19 |
| 3.42 | 0 |
| 2.87 | 0 |
| 2.59 | 0 |
| 2.22 | 0 |
| 1.99 | 0 |

This experiment indicates that the product is ineffective as a copper extractant over the pH range of interest.

EXAMPLE 6

The product prepared in Example 5 was further reacted to prepare 5-dodecyl-2,2'-dihydroxy azobenzene. This was accomplished by the oxidative copper method developed by Pfitzer (Chem. Abs. 46:5856c). The following steps were taken:

1. 72 Gms. of the product from Example 5 was placed in a flask and 750 ml. of ethanol added to dissolve the material. 42 Gms. of cupric chloride was added and the solution heated to reflux (ca.78° C.). 30 Gms. of sodium acetate was added with stirring and then a 30% hydrogen peroxide solution was slowly added with stirring and the mixture refluxed for 3 hours. Sodium bisulfite was added to eliminate any excess hydrogen peroxide and the mixture cooled.

2. The solvent was removed and the product remaining was dissolved in hexane and the product washed with dilute acid and then with water. The solvent was then removed.

3. Carbon, hydrogen, nitrogen analysis and infrared analysis indicated no destruction of the azo linkage. Proton NMR and Carbon 13 NMR indicated the presence of 10% 5-dodecyl-2,2'-dihydroxy azobenzene in the presence of a mixture of 5-dodecyl-2-hydroxy azobenzene and para-dodecyl phenol.

EXAMPLE 7

Product from Example 6 was tested for its ability to extract copper according to the procedure outlined in Example 1. The hydrocarbon fluid used was kerosene. The concentration of the active product of Example 6, 5-dodecyl-2,2'-dihydroxy azobenzene, was 2.2 grams/liter. The following data were obtained:

| pH | % Cu Extraction |
|---|---|
| 5.6 | 100 |
| 3.28 | 81 |
| 2.76 | 66 |
| 2.59 | 45 |
| 2.17 | 15 |

| pH | % Cu Extraction |
|---|---|
| 1.81 | .4 |
| 1.66 | 0 |

These data indicate that the alkyl-modified product extracts copper ions in the pH range of interest in commercial extraction operations, whereas the precursor materials of Example 5 do not.

EXAMPLE 8

It is important that a ligand used in a metal extraction process be able to be reused after being exposed to the low pH conditions encountered by the ligand when its solution is acid-washed to separate the metal value from the metal ligand complex.

If the extractant/carrier solution loses its ability to remove metal ions from solution after the initial stripping step, it would be required to frequently replenish the extractant. Such a procedure would not permit the practical operation of the system.

The activity of the extractant, as measured by percent extraction, is often reduced by decomposition of the organic extractant by acidic attack. In order to determine the effect of extreme acidity on the activity of certain organic compounds potentially useful as extractants, the following experiment was undertaken:

Approximately 2.3 millimole/liter solutions of the compounds described in Table I were prepared in diethyl benzene. A separatory funnel was then charged with 15 ml. of the solution of the organic compound in diethyl benzene together with 15 ml. of aqueous sulfuric acid (200 g/liter). The mixtures were shaken for 2 hours and then the two phases allowed to separate. The aqueous phase was discarded and 15 ml. of water added, followed by shaking for 10 minutes and discarding the aqueous layer. This procedure was repeated three times. A second separatory funnel was then charged with 10 ml. aliquots of the organic solution prepared above together with 10 ml. of a copper sulfate solution containing 0.13 g./liter of cupric ion. The amount extracted into the organic layer by the ligand was then measured.

Table I compares 6 compounds used to extract metal values from aqueous acidic solution. Compound "A" is 2,2'-dihydroxy azobenzene. Compound "B" is 8-hydroxyquinoline, a well-known metal ion extractant in microanalysis. Compound "C" is 2-hydroxy benzophenoxime. Comparison of A, B and C demonstrates that after the acid wash, 2,2-dihydroxy azobenzene is significantly better than materials B and C.

Compound "D" is the product from the preparation given in Example 6. "E" is 6-dodecyl-8-hydroxyquinoline. Compound "F" is 2-hydroxy-4-dodecyl benzophenoxime. It should be noted that all attempts have been made to compare the materials at equivalent active concentrations, but whereas Compounds A, B and C are accurately calculated, Compounds D, E and F are best estimates of equivalent concentration, since all three materials are mixtures.

The data from Table I for Compounds A, B and C indicate that Compounds A and C are significantly better than Compound B, but that there is a reduction in activity for both materials A and C. However, the activity of compound A is still must better than the activity of Compound C, after acid treatment.

The data for Compounds D, E and F indicate slight reductions in activity after acid washing. However, Compound D unexpectedly appears to offer the least loss in activity after acid washing.

| Ligand Structure | pH of Aqueous Solution after acid wash | % Extraction at given pH prior to acid wash* | % Extraction at given pH after acid wash |
|---|---|---|---|
| A- 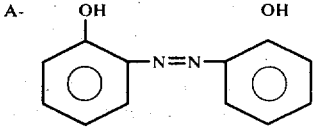 | 2.98 | 100 | 70 |
| B- 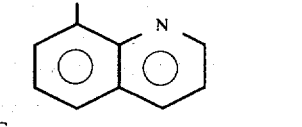 | 2.53 | 75 | 0 |
| C- 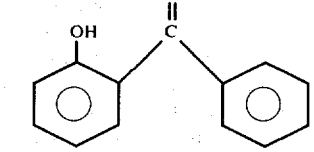 | 3.29 | 69 | 51 |
| D- 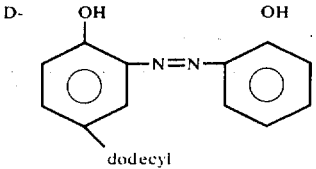 | 3.46 | 100 | 96 |

| Ligand Structure | pH of Aqueous Solution after acid wash | % Extraction at given pH prior to acid wash* | % Extraction at given pH after acid wash |
| --- | --- | --- | --- |
| F- 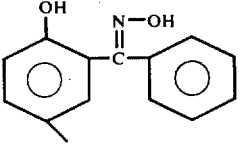 dodecyl | 2.76 | 50 | 43 |
| E- 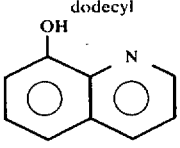 dodecyl | 2.26 | 68 | 58 |

*Estimated from pH vs. % Extraction curves.

EXAMPLE 9

It is known in the art that improved separations would be possible in the solvent extraction process if the extraction could be carried out at higher operating temperatures. This higher temperature permits faster and cleaner separations of the organic from the aqueous phase. However, it is known that most extractants decrease in extracting ability at higher temperatures. In order to evaluate the performance of the product from Example 6, the following experiment was performed:

10 ML of the extractant tested was placed together with 10 ml. of a copper sulfate solution of 1.3 mg/liter copper with an appropriate amount of sulfuric acid to control the pH in a 500 ml. Erlenmeyer flask. The flask was stoppered and placed in a 50° C. water bath and shaken for 15 minutes. After the set period of time, the contents were quickly removed from the bath and poured into a separatory funnel and separated. The pH was measured and the % extraction determined. This experiment was repeated at room temperature.

Table II demonstrates a comparison of the results from the above experimentation using 10 ml. of a 2 g./liter solution of 2-hydroxy-4-dodecyl benzophenoxime and a 10 g./liter solution of the product from Example 6.

TABLE II

| EXTRACTING AGENT | pH | PERCENT EXTRACTION AT ROOM TEMPERATURE | pH | PERCENT EXTRACTION AT 50° C. |
| --- | --- | --- | --- | --- |
| 2-Hydroxy- | 5.01 | 100 | 5.20 | 69 |
| 4-dodecyl | 3.37 | 100 | — | — |
| phenoxime | 2.86 | 100 | 2.65 | 69 |
|  | 2.29 | 68 | 2.12 | 50 |
| Product | 4.71 | 100 | 5.50 | 100 |
| from Ex- | 3.38 | 100 | 3.73 | 100 |
| ample 6 | 2.90 | 89 | 2.96 | 89 |
|  | 2.66 | 66 | 2.63 | 67 |
|  | 2.38 | 38 | — | — |

The above data indicate that at higher temperatures and above pH 2.60 that the comparison material loses extracting power while the product from Example 6 remains surprisingly constant, offering an improvement in the art.

Although the invention has been described in its preferred form with a certain degree of particularity, it is understood that the present disclosure of the preferred forms has been made only by way of example and that numerous changes can be resorted to without departing from the spirit and scope of the invention.

What is claimed is:

1. In a process for the recovery of copper values from an aqueous solution of copper and iron values, wherein said aqueous solution is contacted with an immiscible solution of an extracting agent in an organic solvent and the resultant mixture is separated into a barren aqueous phase and a pregnant organic phase and copper values are subsequently recovered from the organic phase by treatment with an aqueous acid solution, the improvement which comprises utilizing as the extracting agent 2,2'-dihydroxy azoarenes having the formula:

$$Ar - N = N - Ar'$$

wherein Ar and Ar' are each selected from the group consisting of

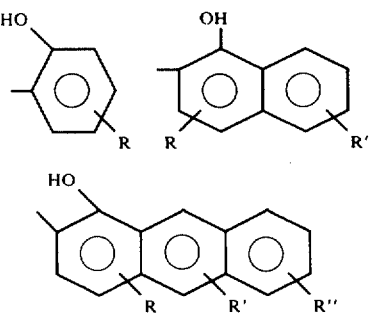

wherein each of R, R' and R'' is a monovalent radical selected from the group consisting of hydrogen and alkyl groups having 1–20 carbon atoms.

2. Process claimed in claim 1 wherein both Ar and Ar' are

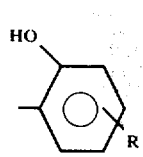

3. Process claimed in claim 2 wherein R is hydrogen in both Ar and Ar'.

4. Process claimed in claim 2 wherein R is methyl in Ar and hydrogen in Ar'.

5. Process claimed in claim 4 wherein R is in the 5 position of Ar.

6. Process claimed in claim 2 wherein R is ethyl in Ar and hydrogen in Ar'.

7. Process claimed in claim 2 wherein R is isopropyl in Ar and hydrogen in Ar'.

8. Process claimed in claim 2 wherein R is isobutyl in both Ar and Ar'.

9. Process claimed in claim 2 wherein R is in the 5 and 5' positions of Ar and Ar', respectively.

10. Process claimed in claim 1 wherein R is isopropyl in both Ar and Ar'.

11. Process claimed in claim 1 wherein the pH of the aqueous solution is about 2 to about 3.

12. Process claimed in claim 1 wherein Ar and Ar' are both

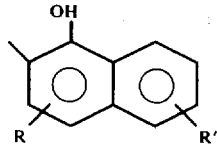

13. Process claimed in claim 1 wherein Ar and Ar' are both

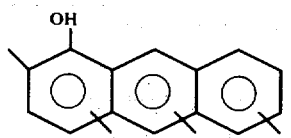

* * * * *